US011387998B2

(12) United States Patent
Fleck

(10) Patent No.: US 11,387,998 B2
(45) Date of Patent: Jul. 12, 2022

(54) PROCESSING PERSONALLY IDENTIFIABLE INFORMATION FROM SEPARATE SOURCES

(71) Applicant: Matthew Fleck, Pleasant Hill, CA (US)

(72) Inventor: Matthew Fleck, Pleasant Hill, CA (US)

(73) Assignee: Anonomatic, Inc., Menlo Park, CA (US)

( * ) Notice: Subject to any disclaimer, the term of this patent is extended or adjusted under 35 U.S.C. 154(b) by 0 days.

(21) Appl. No.: 17/104,583

(22) Filed: Nov. 25, 2020

(65) Prior Publication Data
US 2021/0328776 A1    Oct. 21, 2021

Related U.S. Application Data

(60) Provisional application No. 63/104,853, filed on Oct. 23, 2020, provisional application No. 63/069,565, filed on Aug. 24, 2020, provisional application No. 63/051,260, filed on Jul. 13, 2020, provisional application No. 63/011,711, filed on Apr. 17, 2020.

(51) Int. Cl.
    *H04L 29/06*      (2006.01)
    *H04L 9/08*      (2006.01)
    *H04L 9/40*      (2022.01)

(52) U.S. Cl.
    CPC .......... *H04L 9/088* (2013.01); *H04L 63/0421* (2013.01)

(58) Field of Classification Search
CPC ... H04L 9/088; H04L 63/0421; H04L 9/0894; H04L 2209/42; H04L 9/14; H04L 2209/88
See application file for complete search history.

(56) References Cited

U.S. PATENT DOCUMENTS

| 8,209,549 B1 * | 6/2012 | Bain, III ............ G06F 21/6245 713/193 |
| 10,042,895 B1 * | 8/2018 | Geva ................. G06Q 30/0629 |

(Continued)

OTHER PUBLICATIONS

Losif et al., "Unsupervised Semantic Similarity Computation between Terms Using Web Documents", IEEE Transactions on Knowledge and Data Engineering, vol. 22, Issue: 11, Nov. (Year: 2010).*

*Primary Examiner* — Morshed Mehedi
(74) *Attorney, Agent, or Firm* — Antero Tormey & Petrin; Pete Tormey

(57) ABSTRACT

A method for data security including receiving a first recordset, said first recordset including a first poly-identifier representing a first personally identifiable information (PII), and a first contextual information, said first poly-identifier associated with a name field of a record in a PII structured data store. Also receiving at the server a second recordset, said second recordset including a second poly-identifier representing a second personally identifiable information (PII) and a second contextual information, said second poly-identifier comprised of unique characters associated with the name field of a record in the PII structured data store. Then comparing the first and second contextual information to calculate a correlation score to create a match table entry as a result of said comparing, said match table entry including both an internal ID and an external anonymous ID. The IDs may associate the contextual information between records to a single person.

15 Claims, 8 Drawing Sheets

(56) References Cited

U.S. PATENT DOCUMENTS

| | | | |
|---|---|---|---|
| 2012/0303616 A1* | 11/2012 | Abuelsaad | G06F 21/6254 |
| | | | 707/736 |
| 2014/0280261 A1* | 9/2014 | Butler | G06F 21/6245 |
| | | | 707/756 |
| 2015/0081815 A1* | 3/2015 | Rhim | H04L 51/28 |
| | | | 709/206 |
| 2016/0359900 A1* | 12/2016 | Crisler | H04L 63/1425 |

* cited by examiner

PROCESSING PERSONALLY IDENTIFIABLE INFORMATION FROM SEPARATE SOURCES

PRIORITY

This application claims the benefit of U.S. Provisional applications 63/104,853 filed Oct. 23, 2020, 63/069,565 filed Aug. 24, 2020, 63/051,260 filed Jul. 13, 2020, and 63/011,711 filed Apr. 17, 2020, all by the same inventor, and all included by reference, together with their appendices (if any) as if fully disclosed herein.

BACKGROUND

A major problem with structured data storage is the ability to maintain confidentiality even if access to the data store is somehow compromised. This is most readily apparent for the storage of medical information, where the Health Insurance Portability and Accountability Act (HIPAA) provides for a very high degree of privacy even within a single institution.

Unfortunately, this high degree of privacy prohibits the easy collation, sharing and transfer of information between people and organizations that could benefit from easy access to the information. For example, and without limitation, a physician treating a person suffering a traumatic injury would not have any way to easily access medical, dental and psychological data from various databases. Even if that data was technically accessible, the HIPAA requirement would bar any personal identifiable information (PII) from being disclosed.

Similarly, large record sets of medical research data needs to be scrubbed of PII before it can be share thus severely limiting the ability to cross index datasets to look for correlations and cross correlations in the data and with person's medical history and treatment.

Presented herein are systems and methods for addressing these well-know deficiencies in data management of personal identifiable information.

SUMMARY

Disclosed herein is a method for data security including sundering records to parse PII into different fields and replacing the sundered data with anonymous identifiers. These anonymous identifiers may be keyed to both an internal and external identifier such that one receiving the recordset would not be able to ascertain PII.

Also disclosed herein is a method for data security including receiving at a server a first recordset, said first recordset including a first poly-identifier representing a first personally identifiable information (PII), and a first contextual information, said first poly-identifier comprised of unique characters associated with a name field of a record in a PII structured data store. Also receiving at the server a second recordset, said second recordset including a second poly-identifier representing a second personally identifiable information (PII) and a second contextual information, said second poly-identifier comprised of unique characters associated with the name field of a record in the PII structured data store. Then comparing the first and second contextual information to calculate a correlation score to create a match table entry as a result of said comparing, said match table entry including both an internal ID and an external anonymous ID.

Also disclosed are methods for poly-pseudonymization and storing the PII in a secure structured data store, and combining records form diverse data sources to identify a user from across different data domains.

DESCRIPTION

Generality of Invention

Figure 1:
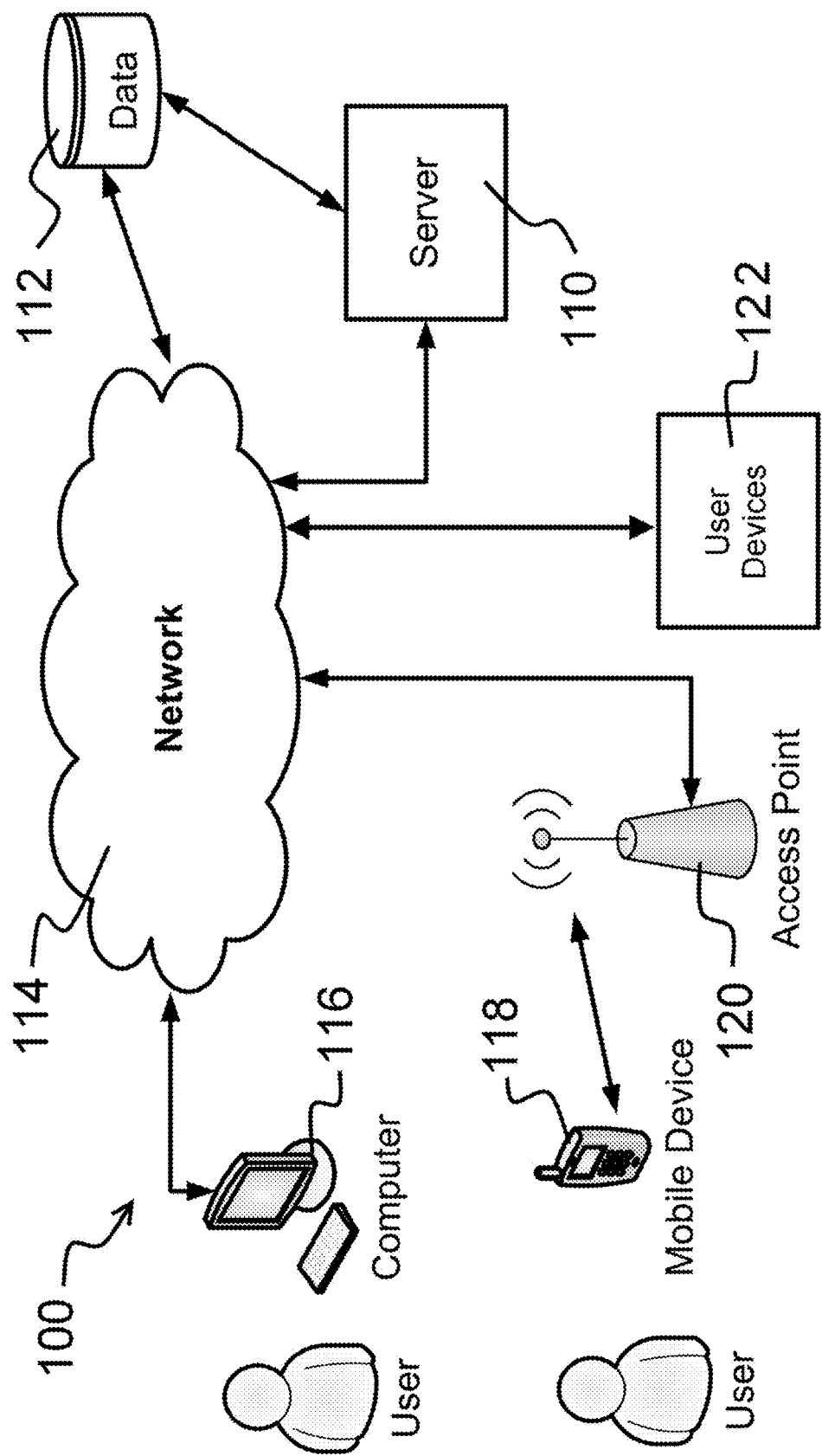
FIG. 1 shows a functional block diagram of a client server system.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Lexicography

The term "declarative language" generally refers to a programming language that allows programming by defining the boundary conditions and constraints and letting the computer determine a solution that meets these requirements. Many languages applying this style attempt to minimize or eliminate side effects by describing what the program should accomplish, rather than describing how to go about accomplishing it. This is in contrast with imperative programming, which requires an explicitly provided algorithm.

The terms "effect", "with the effect of" (and similar terms and phrases) generally indicate any consequence, whether assured, probable, or merely possible, of a stated arrangement, cause, method, or technique, without any implication that an effect or a connection between cause and effect are intentional or purposive.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example and without limitation, in cases in which a measure or value is "relatively increased" or "relatively more", that comparison need not be with respect to any known measure or value, but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The terms "this application", "this description" (and similar terms and phrases) generally indicate any material shown or suggested by any portions of this application, individually or collectively, and include all reasonable conclusions that might be drawn by those skilled in the art when this application is reviewed, even if those conclusions would not have been apparent at the time this application is originally filed.

The term "virtual machine" or "VM" generally refers to a self-contained operating environment that behaves as if it is a separate computer even though is part of a separate computer or may be virtualized using resources form multiple computers.

The acronym "XML" generally refers to the Extensible Markup Language. It is a general-purpose specification for creating custom markup languages. It is classified as an extensible language because it allows its users to define their own elements. Its primary purpose is to help information systems share structured data, particularly via the Internet, and it is used both to encode documents and to serialize data.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

System Elements

Processing System

The methods and techniques described herein may be performed on a processor-based device. The processor-based device will generally comprise a processor attached to one or more memory devices or other tools for persisting data. These memory devices will be operable to provide machine-readable instructions to the processors and to store data. Certain embodiments may include data acquired from remote servers. The processor may also be coupled to various input/output (I/O) devices for receiving input from a user or another system and for providing an output to a user or another system. These I/O devices may include human interaction devices such as keyboards, touch screens, displays and terminals as well as remote connected computer systems, modems, radio transmitters and handheld personal communication devices such as cellular phones, "smart phones", digital assistants and the like.

The processing system may also include mass storage devices such as disk drives and flash memory modules as well as connections through I/O devices to servers or remote processors containing additional storage devices and peripherals.

Certain embodiments may employ multiple servers and data storage devices thus allowing for operation in a cloud or for operations drawing from multiple data sources. The inventor contemplates that the methods disclosed herein will also operate over a network such as the Internet, and may be effectuated using combinations of several processing devices, memories and I/O. Moreover, any device or system that operates to effectuate techniques according to the current disclosure may be considered a server for the purposes of this disclosure if the device or system operates to communicate all or a portion of the operations to another device.

The processing system may be a wireless device such as a smart phone, personal digital assistant (PDA), laptop, notebook and tablet computing devices operating through wireless networks. These wireless devices may include a processor, memory coupled to the processor, displays, keypads, WiFi, Bluetooth, GPS and other I/O functionality. Alternatively, the entire processing system may be self-contained on a single device.

Client Server Processing

FIG. 1 shows a functional block diagram of a client server system 100 that may be employed for some embodiments according to the current disclosure. In the FIG. 1 a server 110 is coupled to one or more databases 112 and to a network 114. The network may include routers, hubs and other equipment to effectuate communications between all associated devices. A user accesses the server by a computer 116 communicably coupled to the network 114. The computer 116 includes a sound capture device such as a microphone (not shown). Alternatively, the user may access the server 110 through the network 114 by using a smart device such as a telephone or PDA 118. The smart device 118 may connect to the server 110 through an access point 120 coupled to the network 114. The mobile device 118 includes a sound capture device such as a microphone. Other connected user devices 122 may also be employed in certain embodiments.

Conventionally, client server processing operates by dividing the processing between two devices such as a server and a smart device such as a cell phone or other computing device. The workload is divided between the servers and the clients according to a predetermined specification. For example, in a "light client" application, the server does most of the data processing and the client does a minimal amount of processing, often merely displaying the result of processing performed on a server.

According to the current disclosure, client-server applications are structured so that the server provides machine-readable instructions to the client device and the client device executes those instructions. The interaction between the server and client indicates which instructions are transmitted and executed. In addition, the client may, at times, provide for machine readable instructions to the server, which in turn executes them. Several forms of machine-readable instructions are conventionally known including applets and are written in a variety of languages including Java and JavaScript.

Client-server applications also provide for software as a service (SaaS) applications where the server provides software to the client on an as needed basis.

In addition to the transmission of instructions, client-server applications also include transmission of data between the client and server. Often this entails data stored on the client to be transmitted to the server for processing. The resulting data is then transmitted back to the client for display or further processing.

One having skill in the art will recognize that client devices may be communicably coupled to a variety of other devices and systems such that the client receives data directly and operates on that data before transmitting it to other devices or servers. Thus data to the client device may come from input data from a user, from a memory on the device, from an external memory device coupled to the device, from a radio receiver coupled to the device or from a transducer coupled to the device. The radio may be part of a wireless communications system such as a "WiFi" or Bluetooth receiver. Transducers may be any of a number of devices or instruments such as thermometers, pedometers, health measuring devices and the like.

A client-server system may rely on "engines" which include processor-readable instructions (or code) to effectuate different elements of a design. Each engine may be responsible for differing operations and may reside in whole or in part on a client, server or other device. As disclosed herein a display engine, a data engine, an execution engine, a user interface (UI) engine and the like may be employed. These engines may seek and gather information about events from remote data sources. Besides engines for querying and reporting on data, certain embodiments may also include an anonymizer engine.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Private, Identifiable Information

Private, identifiable information (PII) may include, but is not limited to: names, birth dates, IDs such as the U.S. social security numbers, account numbers (credit card, bank accounts, etc.), addresses, phone numbers and other data whose exposure or misuse creates risk including other identifiers such as IP address and device identifiers. This type of data is routinely stored in databases. If these databases are compromised, even with internal anonymization techniques, PII may be subject to exposure by experienced data pirates. One benefit of the present disclosure is the ability to reduce or eliminate the risk of exposure of this data in the case of a data breach.

Contextual data is generally data associated with PII but is not personally identifiable. For example, and without limitation, a medical record may include a patient name, age, height, weight, blood pressure and other information. The patent name is PII, while the remainder of the record is contextual data.

Anonymization Engine

Different embodiments of the present disclosure may be effectuated to meet varying demands of data security. Certain embodiments may include a series of processes generally referred to as an anonymization engine. The anonymization engine provides for data transfer between a data source and a data recipient while obfuscating or securing PII. This anonymization engine may include one or more of the following capabilities:

Providing a new and unique identifying value (Anonymous ID) for an entity when requested by a data source providing PII.

Enabling a data recipient to receive the same, but unique, Anonymous ID, for the same individual, when data for that individual is provided by different data sources.

Enabling a dada recipient to receive different and unique Anonymous IDs, for the same individual, when PII for that individual is provided by different data sources.

Enabling the data recipient to receive a matching table which will enable them to link the different Anonymous IDs provided by different data sources.

Enabling a specific individual, whose data is being shared, to grant or deny permission for the data recipient to combine their data from specific data sources.

Operating in a synchronous mode where the data source requests an Anonymous ID and then uses it for processing not connected to the data source.

Operating in a unidirectional, asynchronous mode where the data source provides a complete set of data, including PII, where the Anonymization Engine replaces PII with the Anonymous ID.

Operating in a bi-directional, asynchronous mode where the Anonymization Engine receives a complete set of data, including PII, from a data source then sends it to a data recipient, either with or without replacing the PII with the Anonymous ID, and then sends a response from the data recipient to the data source ensuring the PII has been replaced with the Anonymous ID.

Operating in a bi-directional, asynchronous mode where the Anonymization Engine receives a set of data which includes an Anonymous ID, but no PII. The Anonymization Engine may then replace the Anonymous ID with the PII, send the complete set of data to the data recipient, and then return the data recipient's response to the data source.

Figure 2:
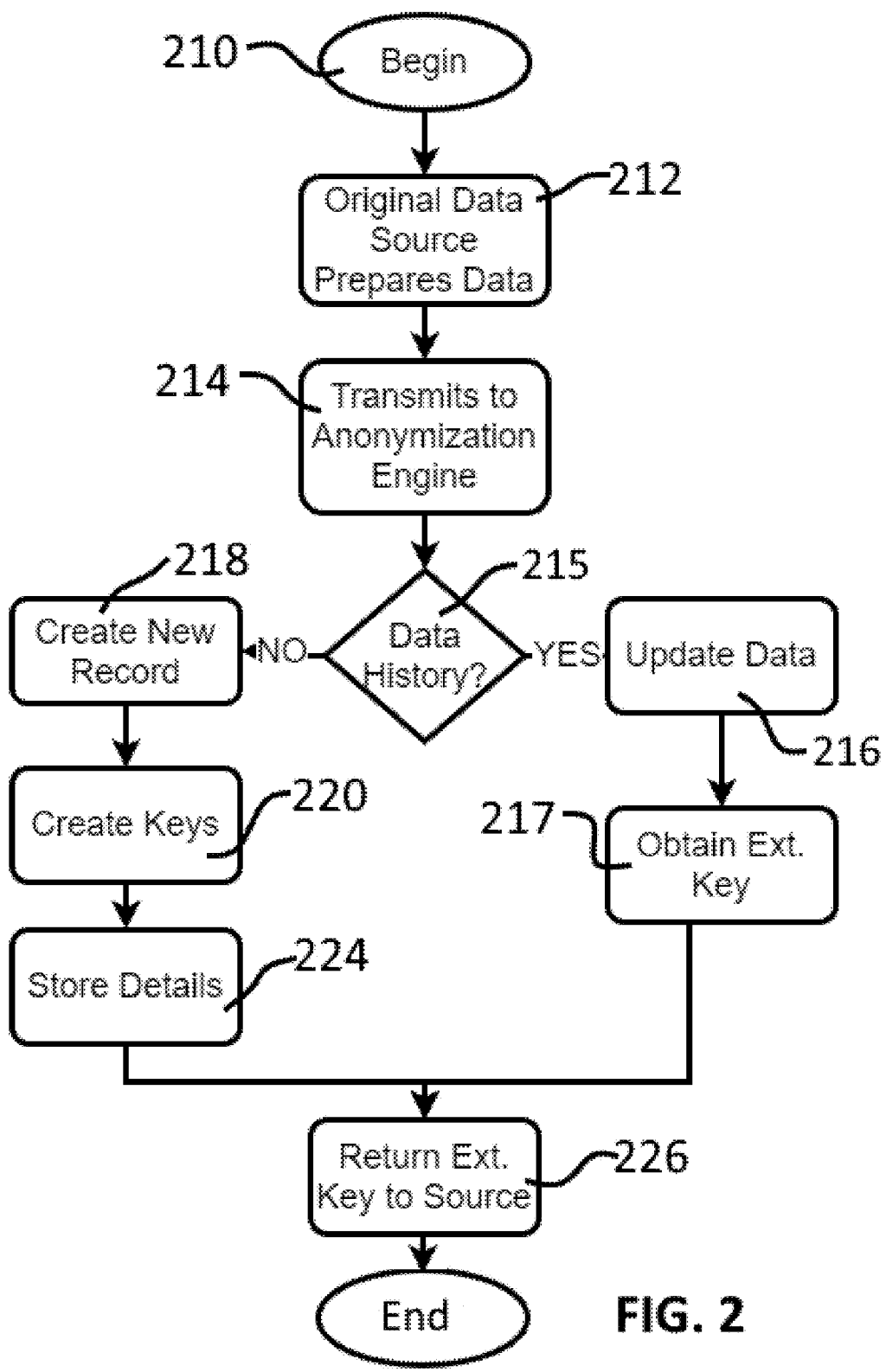
FIG. 2 is a flow chart of certain processes that may be used to effectuate an anonymization engine.

FIG. 2 is a flow chart of certain processes that may be used to effectuate an anonymization engine. The method begins at a flow label 210. At a flow step 212 an original data source prepares data or entry into the method. This data may include PII and a source ID unique to the original data source.

At a step 214 the data from the original data source is transmitted to an anonymization engine.

At a step 215 the anonymization engine analyzes the data to see if there is a history for this PII and this data source. If yes, flow proceeds to a step 216, else flow proceeds to a step 218.

At the step 216 the anonymization engine updates a repository with any changes to PII and obtains an external anonymous key at a step 217.

While at the step 218 the anonymizer engine creates a new record for the new individual and flow proceeds to a step 220.

At the step 220 the anonymizer engine creates both internal and external anonymous keys.

The details are stored at a step 222 and flow proceeds to a step 224.

Figure 3:
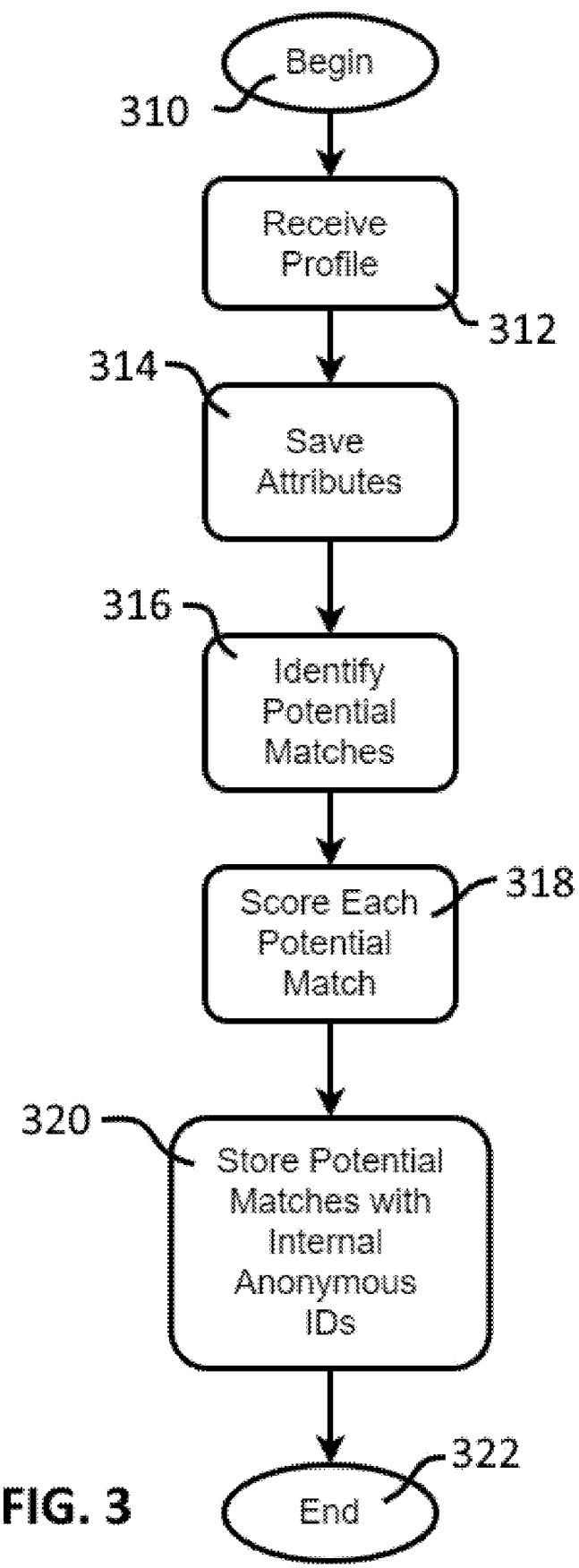
FIG. 3 illustrates a method which includes steps for matching a profile across different data stores.

At a step 226 the external key is returned to the original data source and the method ends FIG. 3 illustrates a method which includes steps for matching a profile across different data stores. The method begins at a flow label 310.

At a step 312 an anonymization service receives a new or updated profile.

At a step 314 the profile is stored.

At a step 316 potential matches are identified by comparing data from different sources.

At a step 318 each potential match is scored with a probability value. The probability value calculation may include one or more scoring algorithms.

At a step 320 the potential matches are stored using internal anonymous identifiers.

At a flow label 322 the method ends.

Internal and External Identifiers

Each data source using the techniques described herein may have a unique identifier or globally unique identifier (GUID). That identifier may be hashed with a unique identifier that the anonymizer stores to create new identifiers or by other processes to achieve the same result. Hashing may be effectuated by systematically converting one value to another in a manner that allows the first value to be retrieved through an additional hashing step. There may be both internal and external identifiers which allow for 3rd parties to use an external identifier for their source. For example, and without limitation, there may be a unique ID for the data source and another for a data destination. Identifiers may employ alphanumeric characters and symbols. Each record containing PII may also include a unique identifier created by hashing both the data source identifier and an identifier for the PII.

In operation the PII and the data source ID may be fed to an anonymizer to create a unique "external" ID that is used only by that data source or the data recipient. While internally the anonymizer keeps its own unique "internal" which may be formed by standard techniques of generating GUIDs or other processes. The IDs or GUIDs may be created dynamically for additional security. For example, and without limitation, a requester for anonymized data may receive a dataset with an external ID, wherein a second requester for the same dataset may receive it with a different external ID. Moreover, a single requester may receive identical datasets with different external IDs depending on the conditions of the request. This may further obfuscate PII from being compromised.

Scoring Algorithms

Scoring algorithms may compare PII among different data sources. For example, and without limitation, each data source may have PII that includes a birthdate, gender and name. If data from two sources contains this exact same PII, a score will be relatively higher. If information is missing, but partially similar, then the score would be relatively lower. If the PII includes different information, then the score will be even lower, indicating a high probability they are not the same person or entity.

The more PII, the better the scoring may be. For example, and without limitation, besides the PII information listed above, other information such as high school attended, branch of the military, social security number, and the like may be included to calculate a score. Conventional weighting methods may be used to guide the calculation to a more accurate scoring process. For example, birthdays may be more significant than birthplace.

Scoring algorithms are not restricted to matching data between two different data sources. For example, Source #1 may provide only name and driver's license number. Source #2 may have name, gender, birth date and social security number. Based on this information alone, these two records could not be positively linked. However, if Source #3 were able to provide both social security number and drivers license number then all three records could be matched with a very high score.

Matching Request

Figure 4:
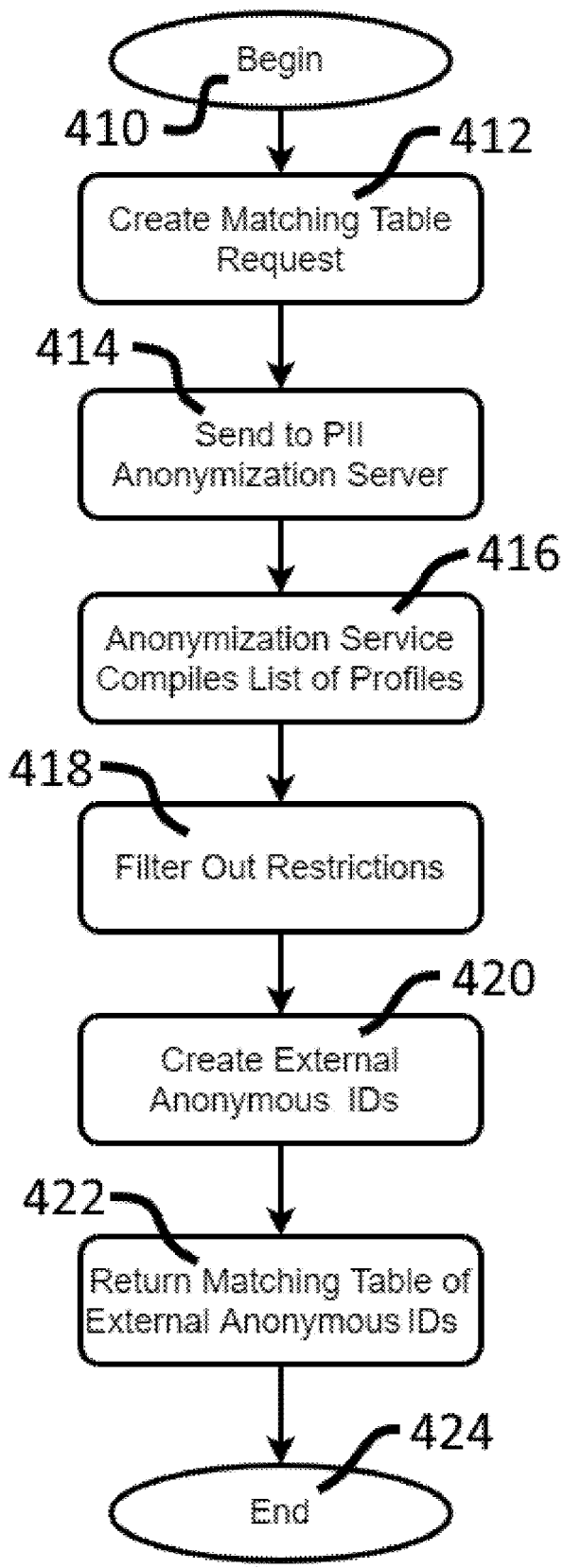
FIG. 4 shows a method which may be employed to retrieve matched data form a variety of sources.

FIG. 4 shows a method which may be employed to retrieve matched data form a variety of sources. The method begins at a flow label 410.

At a step 412 an aggregator creates a matching table request. This request may include a scope and a minimum matching score information.

At a step 414 the request is sent to the anonymization server.

At a step 416 the anonymization server compiles a list of profiles that meet the criteria. This list includes internal anonymous IDs.

At a step 418 restrictions are filtered out. These restrictions may include, but our not limited to, restrictions on access which may be placed by the person of entity whose private information is contained in the database. For example, and without limitation a user may restrict who has access to their PII. That restriction may be imposed on the data requestor by the anonymizer.

At a step 420 external IDs are created using an algorithm tailored to the requestor. For example, and without limitation that algorithm may hash the internal ID with the data requester's unique ID.

At a step 422 the matching table, anonymized with external IDs is returned to the requester.

At a flow label 424 the method ends.

PII Vault

Figure 5:
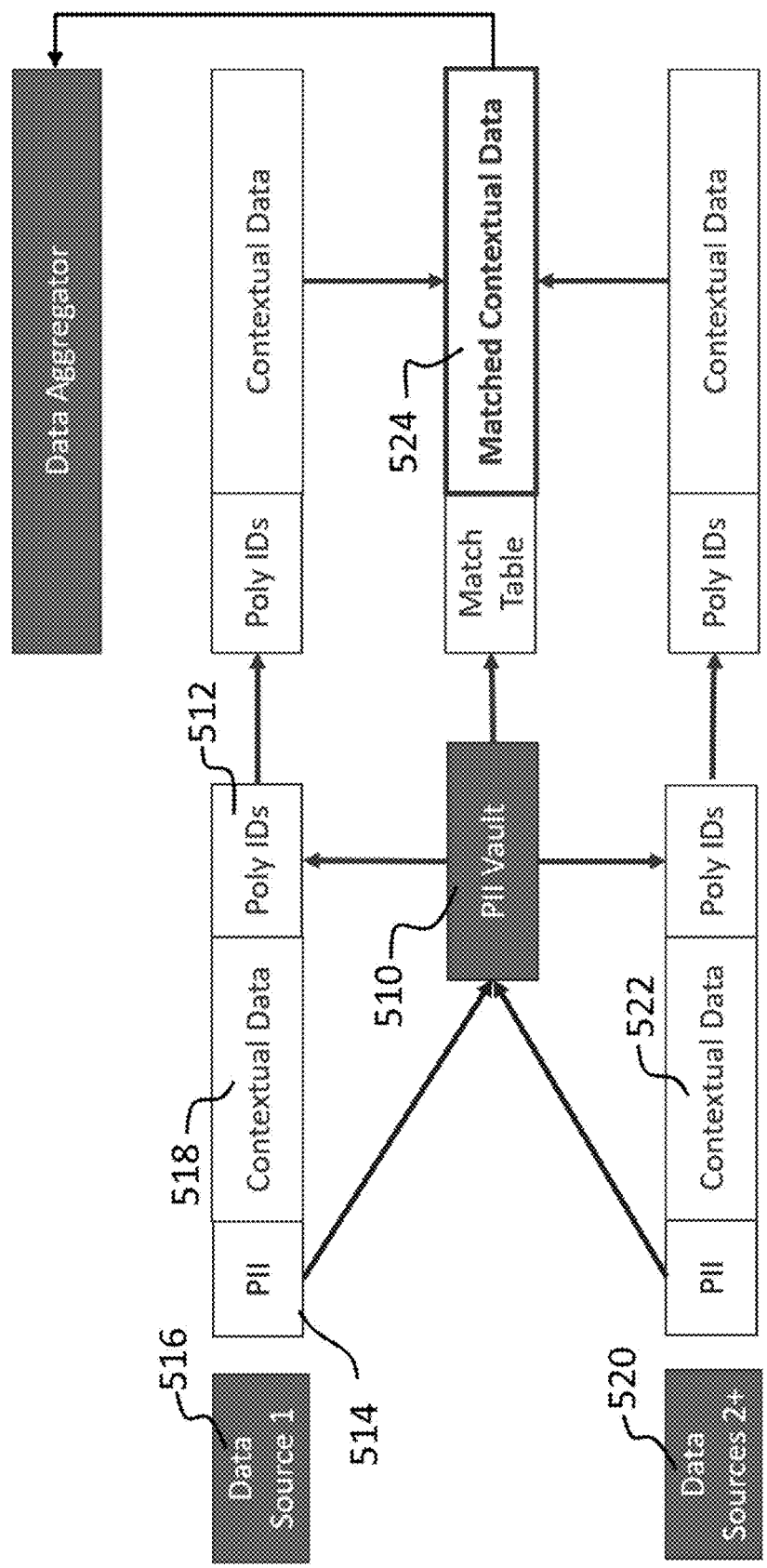
FIG. 5 illustrates certain operation of a PII vault.

FIG. 5 illustrates certain operation of a PII vault 510. A PII vault 510 stores PII in relation to a poly-anonymous identifier ("Poly IDs") 512. A poly-anonymous identifier 512 is a unique identifier stripped of any recognizable PII such as an External Anonymous ID referenced herein. The PII vault 510 may include encrypted or non-encrypted data. The Poly ID 512 may be encoded in the PII Vault 510 or created dynamically depending on the implementation. For example, certain Poly IDs 512 may be a "use once" implementation, while others may be established for long-term implementations and preserved in the PII Vault 510.

In operation the PII vault 510 stores PII 514, and, when queried, returns Poly IDs 512. The Poly ID 512 can be used to replace PII 514 in an original data source 516. For example, and without limitation, Data Source 1 516 includes both PII 514 and contextual data 518. Moreover, because Poly IDs are unique to a specific domain, contextual data 522 from different sources 520 may be matched for future processing. Matching data may be effectuated using techniques described herein. The matched contextual data 524 from multiple data sources may now be passed to a data aggregator for further processing with the Poly ID 512 standing in the place of the original PII. The match table includes record matching information from data source 1 516 and data sources 2 520 such that queries indicate the contextual data 518 and 522 are from the same person.

Sundering

Figure 6:
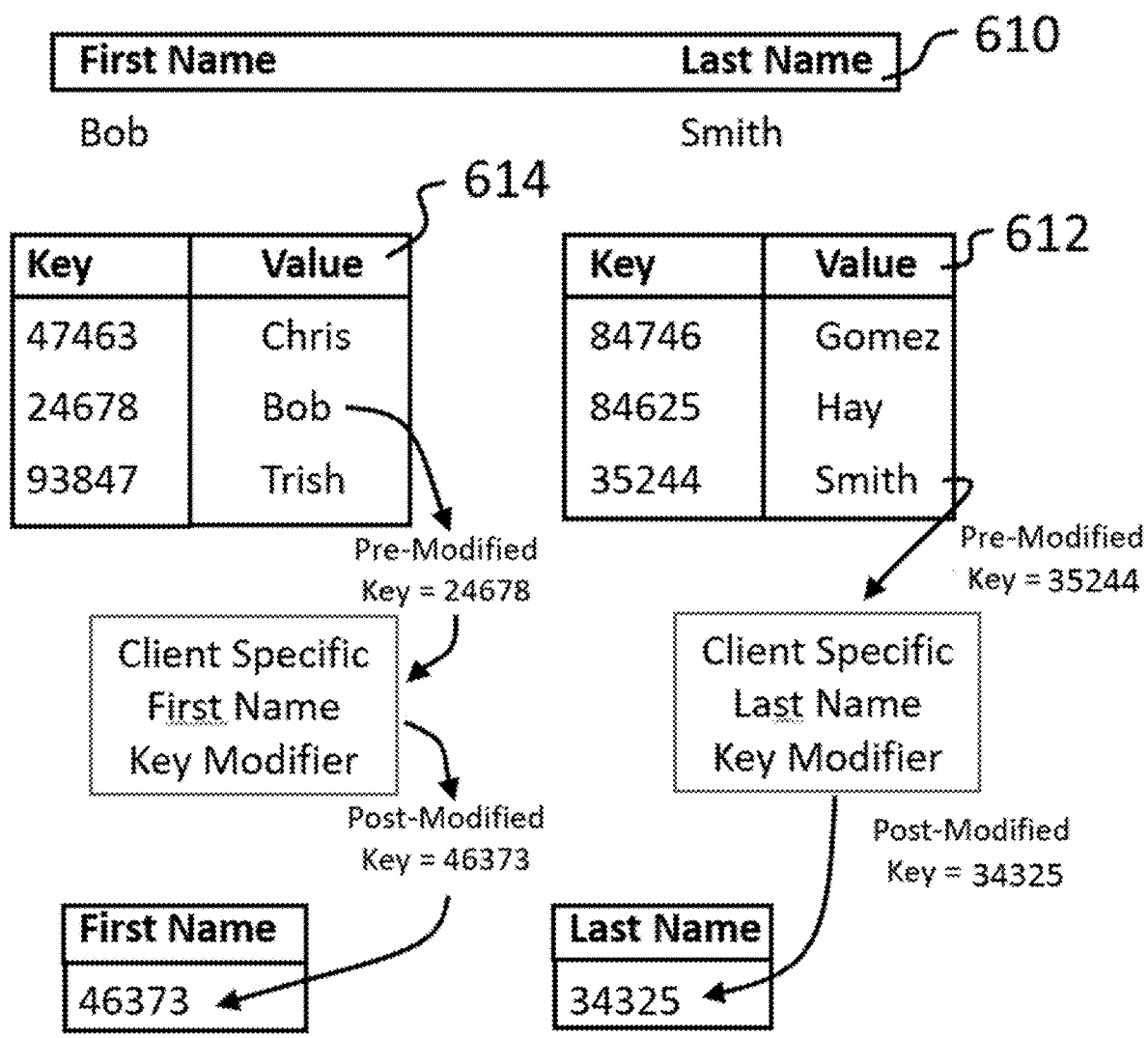
FIG. 6 illustrates a process for data record sundering.

FIG. 6 illustrates a process for data record sundering. A record 610 including a field for a first name and a last name has data "Bob" for the first name and "Smith" for the last name. This record may be represented in two different tables, a last name table 612 and a first name (key) table 614. A first name table 614 may include a unique key for every unique first name value in the table. Similarly, a last name (key) table 612 may have a unique key for every unique last (or family) name value. Each Key field in these tables may be automatically assigned a unique number within that table.

While FIG. 6 only shows information for two fields in a record, this application should not be ready as limiting in any way. For example, and without limitation, fields such as Date of birth, Gender, Social Security Number, and other PPI may be included. Accordingly, a record for a new Person record could be created that has four numeric key values. Each of the numeric values would point to the appropriate value within the table that stores values for that column. For example:

First_Name_ID=1001
Last_Name_ID=8493
Date_Of_Birth_ID=2612
Gender_ID=2

Additionally, a single value may be broken in the multiple sundered values. For example, and without limitation, a social security number of 111-22-3333 could be stored as three independent sundered values with a different sundered ID for the first part—111, the second part 22, and the final part 3333.

However, merely splitting the table and assigning a unique key is insufficient to hinder unauthorized use of the data. Anyone who was able to access the database would have the ability see all of the data values of each record. To fully sunder the record a modifier may be used. A modifier is a number which is used to alter the value of the ID column in the person record so it does not point to the correct record in the table but instead points to an incorrect record in the table. For example, if the Modifier for First Name was +27 then the value of First Name Key stored on the person record, for anyone with the same first name would be the original Key plus 27. Therefore, a person reading this as a simple substitution would be thwarted by the offset. Embodiments that employ this approach, and by using different modifiers for each column, will hamper the ability of anyone who was able to gain access to the database, but was not provided with the appropriate Modifiers, would not be able to actually read and understand any of the Person records because as far as they were able to ascertain, the values would evaluate to incorrect data. Modifiers may be positive, negative or other mathematical functions that may be operated on a Key to provide a reliable post-modified Key.

In FIG. 6 a pre-modified Key 24678 for the first name "Bob" may be modified to have a post-Modified Key of 46373. Note also, that both the first name field and the last name filed may have different Modifiers. Moreover, every field may have its own Modifier.

In some embodiments further obfuscation may be accomplished with additional steps. In embodiments with different logical "owners" for different rows, each logical owner of different data rows in a dataset could be allocated different Modifiers. Thus, if someone was able to recombine data for one data owner, they would not be able to do the same for any other data owner unless they also had those Modifiers.

In some embodiments, Modifiers may be in two parts with one part (External) being provided to each customer (Data Owner) and the second part (Internal) being assigned and kept internally for each customer. It is not the value of either the Internal or the External modifier which is used provide the appropriate link but rather both of them combined. For example, and without limitation, if customer A is given an External First Name Modifier of 231, which they may know, and an internal modifier of −523 which they would not know. The actual First Name Modifier would be 231-523=−292. If customer A is given an External First Name Modifier of 843, which they may know, and assigned an internal modifier of −1089. Their actual First Name Modifier would be 843-1089=−246. Accordingly, the External Modifiers may be generated and provided to the customer but never stored by a data store or storage controller. The Internal modifiers may be generated for each customer but never provided to that customer.

One major benefit of internal and external keys is that even the data storage provider, which stores and manages all of the data, could not properly recombine all of the data without being provided the external ID from the customer. Moreover, if a hacker were to create a customer account, and get their external ID, it would not aid them in stealing anyone else's data.

Sundering Data Locations

One requirement for a data storage custodian may be to locate PII in specific countries or geographic areas to comply with laws or for better quality of service. To effectuate this, each record may have the location of the data provider or data source sundered and recorded as data in the data store. This may allow for sharing data internationally, but still maintaining PII private because the data that must be held in confidence remains subject to these requirements, but other, non-confidential, data may be readily available around the world. This may be effectuated with a location table including unique IDs for each location. With the location data sundered, it may then be further obfuscated using an offset as described herein.

Figure 7:
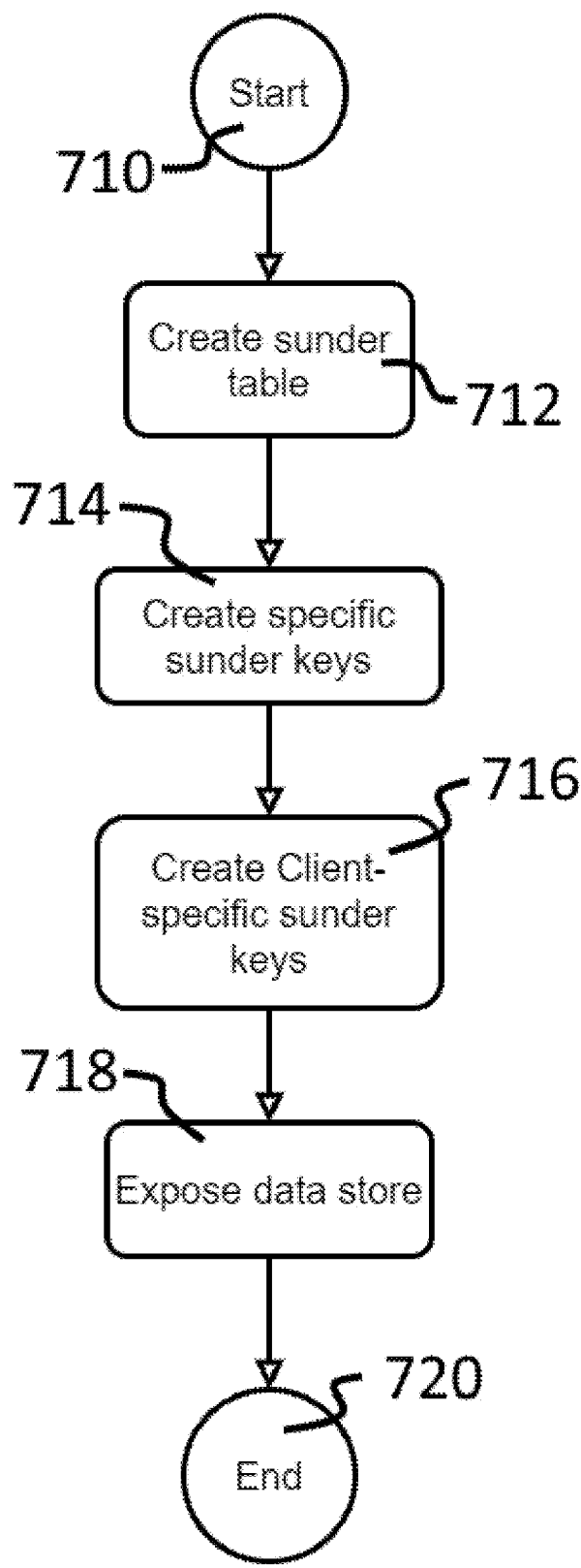
FIG. 7 shows a flowchart of steps which may be employed in certain embodiments.

FIG. 7 shows a flowchart of steps which may be employed in certain embodiments. In FIG. 7 the method starts at a flow label 710. At a step 712 a sunder table is created. This table may be for first names, last names, locations or any other data descriptor suitable for the application.

At a step 714 specific sunder keys are created. These are unique to every data owner and data column being sundered.

At a step 716 client-specific sunder keys are created. These are unique to each client/user intending to store data in the manners described herein. The client specific sunder keys are combined with the sunder keys for each data when storing or retrieving data in the data store.

At a step 718 the data store is exposed to users. This exposure may be in one of the many convention data access methodologies such as SQL Server, XML, and the like. Some embodiments may expose an API for interfacing with a user thereby allowing the entire database to remain securely behind a firewall.

At a flow label 720 the method ends.

The methods described herein may not require each and every step be performed or that each step be performed in the manner disclosed. Embodiment may be effectuated using various elements and steps described.

Searching the Data Store

One of the key values of Sundering is the ability to search the data which is something that encrypting data fields in a database does not easily allow. When data is 'sundered' as disclosed herein, each pertinent value from a data record (i.e. any field which is sundered) may be placed in a column-oriented table. That table typically holds just two fields, a numeric ID and the value being sundered. For example, and without limitation, a sunder-table that holds first names as shown:

| First Name ID | First Name |
|---|---|
| 1 | Matt |
| 2 | Brenna |
| 3 | Brianne |
| 4 | Jennifer |
| 5 | Rachel |
| 6 | Garrett |
| 7 | Mark |
| 8 | Jenny |
| 9 | Lisa |
| 10 | Eric |

When there is a data record in for first name Jenny, the First Name ID value for that record is 8. However, if the sunder value for first name is −2 the value stored in the record for Jenny, as her first name, is 6. (8+(−2)=6). Therefore, to de-sunder the record the process is reversed by taking the value of First Name ID on her record and multiply the sunder key by −1 resulting in 6+('2*−1)=8. This would point to the correct value.

To query, find the record id (i.e. select first_name_id where first_name='Jenny') which would equal 8 and then apply the sunder key (−2) to find any record with that value. A direct query may look like this:

```
Select *
    From person
    Where first_name_id =
        ( (select first_name_id
            From first_name_table
            Where first_name = 'Jenny'
        ) * @sunder_value )
```

While the query shown operates on a known sunder key, it may be expanded to include both internal and external sunder keys by adding the external sunder key to create a combine value useful for searching.

In yet another embodiment the sunder keys may be hidden. For example, and without limitation, a customer may be given an account key which provides access to the system. That key could be in the form of a globally unique identifier (GUID) such as CA2071FD-288D-4771-BDBD-9FC6FC77C0F2. The external customer sunder key for first name could be the decimal value of characters 2 and 5 multiplied by each other. In this example the second character in the sequence "2" is the letter "A" in hexadecimal notation. An 'A' in hexadecimal equates to 10. When the 10 is multiplied by character 7 (the 5th character in the GUID) the external sunder key would be 70. Each field being sundered could be a different combination of characters from the account key and various other, similar, methods could be used to determine the sign (positive or negative) of each value. In this embodiment a GUID will include one or more sunder keys.

Different embodiments of the present disclosure may be effectuated to meet varying demands of data security. Certain embodiments may include a series of processes generally referred to as an anonymization engine. The anonymization engine provides for data transfer between a data source and a data recipient while obfuscating or securing PII. This anonymization engine may include one or more of the following capabilities:

Providing a new and unique identifying value (Sunder Key) for an entity when requested by a data source providing PII.

Enabling a dada recipient to receive different and unique Sunder Keys, for the same individual, when PII for that individual is provided by different data sources.

Enabling the data recipient to receive a matching table which will enable them to link the different Sunder Keys provided by different data sources which may be in different locations.

As shown herein, data sundering provides distinct advantages over traditional encryption because it may be easier to search, and even if nefarious people gain access to the data source, there are multiple keys required to make any sense of the data. These keys may include the name table, the sunder Key, and any external key.

Re-Identification Prevention

Even with PII anonymized, there is a risk that the persons related to the data may be determined through a re-identification technique. This may occur when small recordsets of ancillary data are exposed to the public. For example, there may only be only one Asian-American in a recordset from a small county. Knowledge of a small population may enable one to determine who that Asian-American is. Therefore, small recordset results, or groups, may pose a particular risk of re-identification after anonymizations.

The ancillary data associated with a person's PII may be easier to re-identity if more than one data field is selected. These demographics or groupings may provide multiple levels of information that identify a person such as race, gender, location, and age. Collectively, the more information provided, the easier it would be to determine the exact person. For example, and without limitation, it would be easier to identify an Asian-American woman in her twenties living in a certain town then to identify a woman in the town, or an Asian-American woman in the town.

| Zip Code | Gender | Race | Count |
|---|---|---|---|
| 79701 | Female | White | 2,345 |
| 79701 | Male | White | 6,789 |
| 79701 | Male | Alaskan Native | 2 |
| 79701 | Female | Latinx | 5,321 |
| 79701 | Male | Latinx | 8,456 |
| 79701 | Male | Pacific Islander | 5 |

To maintain anonymization, a re-identification blocker may ensure that no combination of poly-groups can result in a data set smaller than a predetermined minimum number. Table 1 below shows an example of a dataset that may be returned by querying anonymized data.

TABLE 1

| Zip Code | Gender | Race | Count |
|---|---|---|---|
| 79701 | Female | White | 2,345 |
| 79701 | Male | White | 6,789 |
| 79701 | Male | Alaskan Native | 2 |
| 79701 | Female | Latinx | 5,321 |
| 79701 | Male | Latinx | 8,456 |
| 79701 | Male | Pacific Islander | 5 |

In Table 1 it is easy to see that zip code 79701 only has two male Alaskan natives and only 5 male Pacific Islanders. Determining who those people are would be relatively easy for one familiar with zip code 79701. To defeat this re-identification, table 2 shows a minimum count of 20 for males with an unknown race. The minimum amount selected may be a number small enough to be statistically insignificant thereby protecting the integrity of the dataset.

TABLE 2

| Zip Code | Gender | Race | Count |
|---|---|---|---|
| 79701 | Female | White | 2,345 |
| 79701 | Male | White | 6,782 |
| 79701 | Male | Unknown | 20 |
| 79701 | Female | Latinx | 5,321 |
| 79701 | Male | Latinx | 8,450 |

Table 2 also combines the Pacific Islanders with the Alaskan natives and adjusts other numbers accordingly. Various embodiments may use different criteria to set minimum numbers and group ratios to effectuate different data requirements.

Poly-pseudonymization

Figure 8:
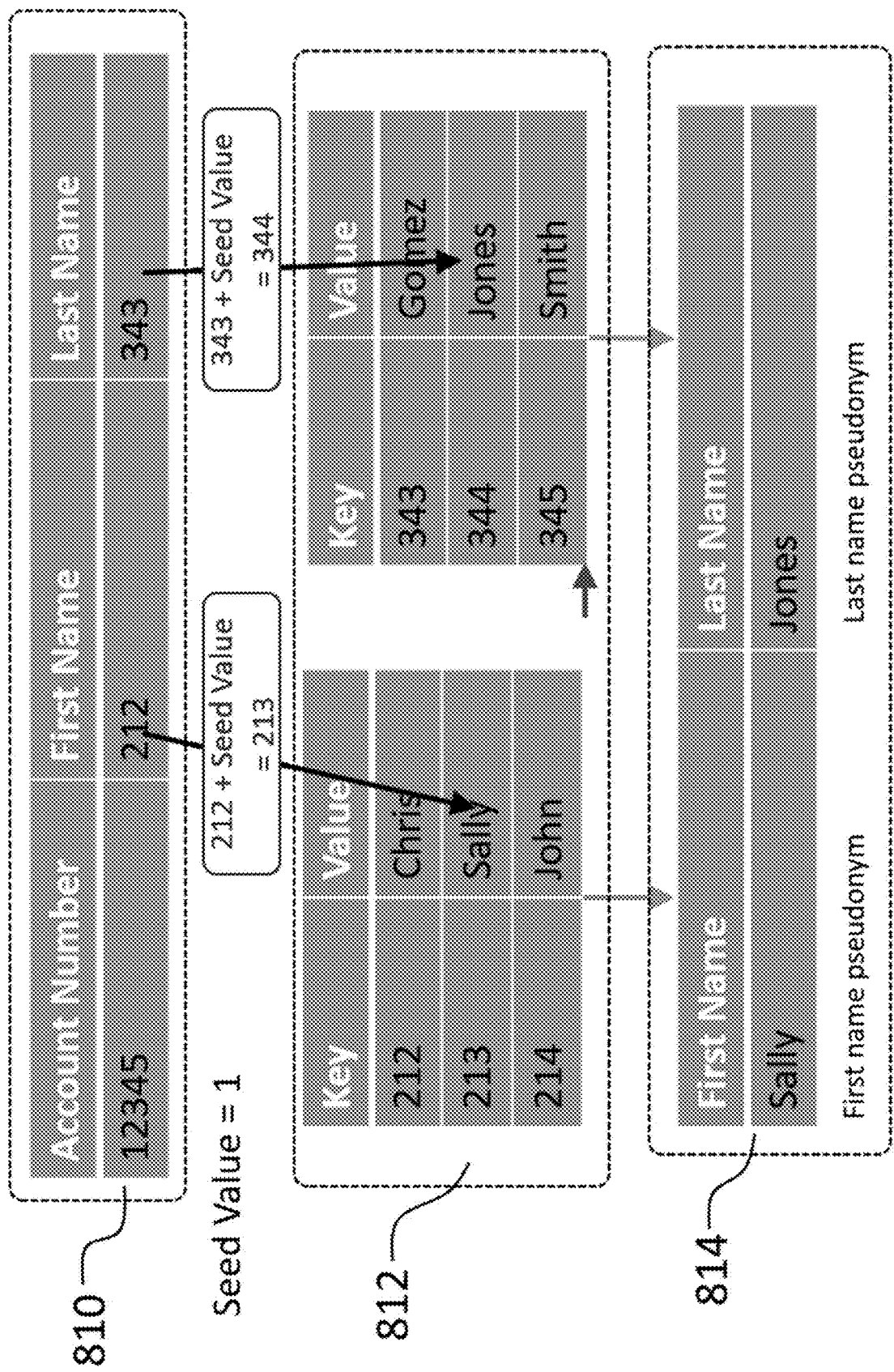
FIG. 8 shows a process for poly-pseudonymization.

FIG. 8 shows a process for poly-pseudonymization that may be employed in some embodiments. Poly-pseudonymization may be used to anonymize PII, not by removing all of the PII but instead by replacing it with syntactically correct but inherently inaccurate values.

In FIG. 8 a sundered record 810 for account 12345 has a first name encoded as 212 and a last name encoded as 343. Without poly-pseudonymization the key table 812 would equate to the name to Chris Gomez. It should be noted that Chris Gomez is not the actual name found in the specific account holder but is instead a sundered representation of the account holder's real name. In this instance Chris Gomez is a pseudonym for the account holder's true name. Additionally, with poly-pseudonymization a seed value may be used to skew the key table information and generate any number of pseudonyms. As shown in FIG. 8, a seed value of 1, skews the key up one so that the first name returned is Sally and the last name returned is Jones 814. Moreover, seed value may be positive, negative, or set by other means such as a time stamp, the day of the year, or an identifier unique to the party receiving the record information.

Advantages

The methods and techniques presented herein provide a novel way to merge data from discrepant sources, correlate to determine if the data in those sources relates to a single entity (a person or otherwise) and present the unified data to a requestor in a usable format without divulging any PII. Moreover, even if the source data is compromised there is no relation to the entity whose PII is included. Additionally, if the anonymizer's data is also compromised, there is no relation to the entity whose PII is stored either because of the use of an internal anonymous identifier and/or poly-pseudonymization.

Accordingly, the one advantage is that secure reliable data from different sources may be used without risk of divulging that data inappropriately. For example, and without limitation, for the first time ever, student academic data such as attendance records may be analyzed in relationship with the medical care and services those students have received. Al without divulging PII.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of any claims.

Accordingly, it is appropriate that the appended claims be construed broadly and in a manner consistent with the scope of the invention, as set forth in the following claims.

What is claimed:

1. A method for data security including:
    receiving at a server a first record, said first record including a first poly-identifier representing a first personally identifiable information (PII), and a first contextual information, said first poly-identifier comprised of unique characters associated with a name field of a name record in a PII structured data store;
    receiving at the server a second record, said second record including a second poly-identifier representing a second personally identifiable information (PII) and a second contextual information, said second poly-identifier comprised of unique characters associated with the name field of the name record in the PII structured data store;
    comparing the first and second contextual information to calculate a correlation score said comparing including identifying at least one contextual information common to both the first record and the second record;
    creating a match table entry as a result of said comparing, said match table entry including both an internal ID and an external anonymous ID, and
    transmitting the external anonymous ID over a network.

2. The method of claim 1 wherein the first poly-identifier and the second poly-identifier are generated using an online anonymization server.

3. The method of claim 1 wherein the first poly-identifier is associated with the name record using a predetermined offset value from a record including the PII.

4. The method of claim 3 wherein a portion of the PII has a first poly-identifier and a portion of the PII has a second identifier.

5. The method of claim 1 wherein the contextual information includes medical information.

6. The method of claim 1 wherein the PII includes at least one of a family name or a social security number.

7. The method of claim 1 wherein the match table entry includes record matching information a plurality of data sources associated with the same person.

8. A method of merging data from different data sources including; receiving at a server a first record, said first record including a first personally identifiable information (PII), and a first contextual information; receiving at the server a second record, said second record including a second personally identifiable information (PII), and a second contextual information; substituting the first PII with a first private key; substituting the second PII with a second private key; comparing the first contextual information with the second contextual information said comparing including identifying at least one contextual information common to both the first record and the second record; calculating a correlation score as a result of said comparing, and creating both an internal ID and an external anonymous ID in response to said calculating.

9. The method of claim 8 wherein the PII includes at least one of a family name or a social security number.

10. The method of claim 8 wherein the contextual information includes at least one of a medical information, a racial information, or education information.

11. The method of claim 8 wherein the first private key is related to a record containing the first PII through a record identifier offset.

12. The method of claim 8 wherein the first and second private key are stored in different records in a data store.

13. The method of claim 8 further including:
  skewing a value in a key table entry in the data store for use in the private key.

14. The method of claim 8 wherein the first private key and the second private key are generated from different records in the same data source.

15. The method of claim 8 further including:
  storing the internal ID and the external anonymous ID in a match database, said match database including association information indicating that the first contextual information and the second contextual information relate to the same person.

* * * * *